US005828697A

United States Patent [19]

Shin

[11] Patent Number: 5,828,697

[45] Date of Patent: Oct. 27, 1998

[54] MODEM HAVING EXTERNAL RESET CIRCUIT

[75] Inventor: Seong-Kee Shin, Kyungki-do, Rep. of Korea

[73] Assignee: SamSung Electronics Co., Ltd., Kyungki-do, Rep. of Korea

[21] Appl. No.: 757,092

[22] Filed: Nov. 26, 1996

[30] Foreign Application Priority Data

Nov. 28, 1995 [KR] Rep. of Korea .................. 44289/1995

[51] Int. Cl.[6] ................................ H04B 1/38; H04L 5/16

[52] U.S. Cl. ........................... 375/222; 375/377; 327/198

[58] Field of Search .................................... 375/222, 377, 375/220; 327/142, 198; 379/93.28, 93.36; 395/311, 570, 573

[56] References Cited

U.S. PATENT DOCUMENTS 4,742,482 5/1988 Inskeep et al. .
4,782,498 11/1988 Copeland, III .

*Primary Examiner*—Wellington Chin
*Assistant Examiner*—Jean B. Corrielus
*Attorney, Agent, or Firm*—Robert E. Bushnell, Esq.

[57] ABSTRACT

A specially designed external reset circuit for a modem in a computer system includes an external reset switch provided on the computer system accessible to a user and operable to generate a manual reset signal in response to the user's manipulation of said external reset switch. A signal stability circuit is connected to the external reset switch, for stabilizing the manual reset signal and preventing occurrence of a sudden surge of voltage when the external reset switch is turned on and turned off. A signal combination circuit includes a first input terminal coupled to receive occurrence of the manual reset signal and a second input terminal coupled to receive occurrence of a computer reset signal generated from the computer system, for logically combining occurrence of the manual reset signal and the computer reset signal to generate a modem reset signal. And a modem control circuit including a modem having a reset terminal connected to the signal combination circuit, for resetting operation of the modem in response to reception of the modem reset signal.

20 Claims, 3 Drawing Sheets

FIG. 1 *(Prior Art)*
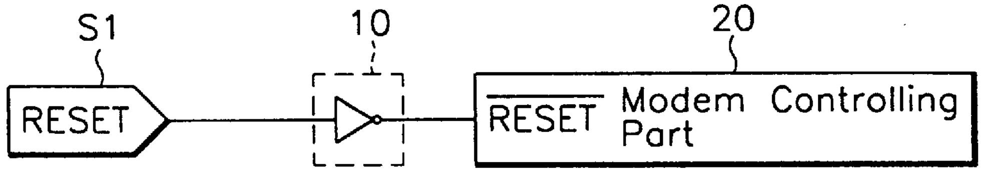
FIG. 2 *(Prior Art)*
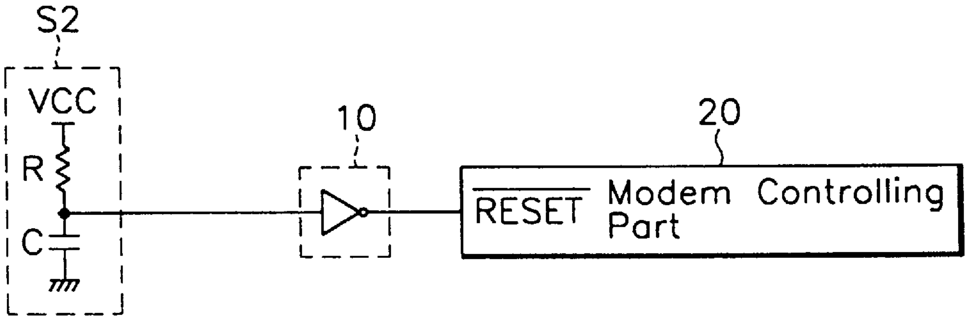
FIG. 3
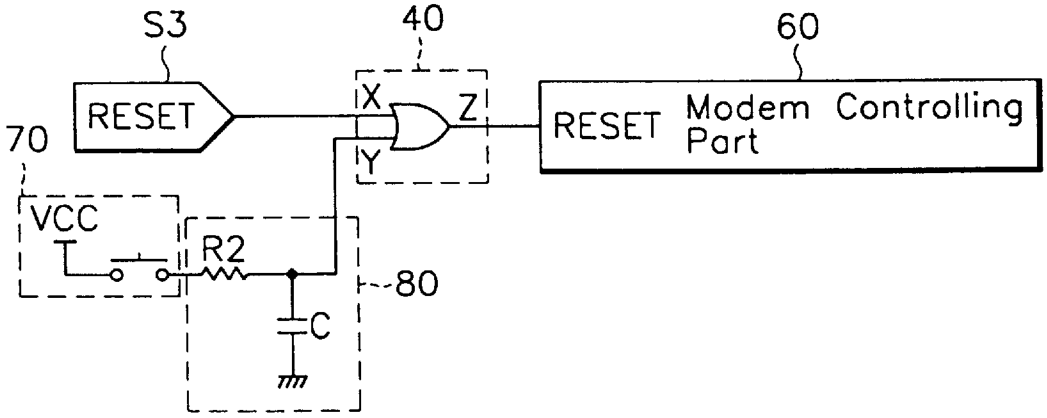

MODEM HAVING EXTERNAL RESET CIRCUIT

CLAIM FOR PRIORITY

This application makes reference to, incorporates the same herein, and claims all benefits accruing under 35 U.S.C. §119 from an application for Modem Having External Reset Circuit earlier filed in the Korean Industrial Property Office on 28 Nov. 1995 and there duly assigned Ser. No. 95-44289.

BACKGROUND OF THE INVENTION

1. Technical Field

The present invention relates to a modem having an external circuit, and more particularly, relates to a modem having an external reset circuit for generating a reset signal to reset operation of the modem in response to a user's manual manipulation of the external reset circuit.

2. Background Art

Conventional modem is known as a data communication adapter comprising a modulator-demodulator for telephone network communication between computer systems. Modems for personal computer applications are currently available in two general types: (1) an internal modem typically contained on a single printed circuit board and adapted to be inserted into an expansion slot providing within the computer housing; and (2) an external modem having its own power supply and connected to an input/output (I/O) port of the computer.

Generally, modem is intended for data communication between computer systems such that a separate reset circuit is not required to reset the modem for different data transfer rates. Consequently, a separate reset circuit is not included in the modem in order to minimize production cost. Usually, the internal modem is conveniently disposed within the computer housing and need not include its own power supply. However, it has disadvantages in that it provides no visual display of modem activity and requires that the entire computer including the modem be shut down and rebooted in the case of a modem jam. In contrast, the external modem includes one or more indicators displaying the modem activity and is provided with a separate on/off control switch for turning on/off the modem independently from the computer so that the modem can be rebooted separately from the computer in case of a modem jam. The disadvantages of the external modem is that it requires the provision of an AC adapter, external cabling for connection to the computer and an extra serial I/O port even when not in use. Recent efforts such as disclosed in U.S. Pat. No. 5,050,041 for Modem Mountable In Wall Of A Computer Housing With Readily Accessible On/Off Switch Connecting Either Modem Or An Auxiliary Serial Port To An I/O Port issued to Shafi, have been made to provide a hybrid configured modem suitable for mounting in a computer slot but retaining communication indicators and an on/off switch that is readily accessible to the user. No reset circuit is, however, required to reset operation of the modem.

Recent advanced modem having multiple functions including a facsimile function, a voice function in addition to the original function, however, requires some reset schemes for initializing operation of the modem for different data transfer rates. Examples of such a modem are disclosed in U.S. Pat. No. 4,811,358 for Subscriber Line Interface Modem issued to Smedley et al., and U.S. Pat. No. 5,537,654 for System For PCMCIA Peripheral To Execute Instructions From Shared Memory Where The System Reset Signal Causes Switching Between Modes Of Operation By Alerting The Starting Address issued to Bedingfield, in which a subscriber line interface modem is reset in response to a reset signal generated from the computer's CPU. When the modem having multiple functions operates in a voice function, however, an internal reset command is not generated, and consequently, power must be applied to the modem again or the computer must be rebooted in order to reset the modem for different data transfer rates. It is my observation that longer time is necessary to reset a modem having multiple functions.

SUMMARY OF THE INVENTION

Accordingly, it is therefore an object of the present invention to provide an improved modem configuration having an external reset circuit.

It is also an object to provide an improved modem configuration having an external reset circuit for allowing the user to quickly reset the modem for different data transfer rates.

It is another object to provide an improved modem configuration having a separate reset circuit for resetting only the modem in response to request of the user without resetting power of the computer.

These and other objects can be achieved by a specially designed external reset circuit for a modem in a computer system including an external reset switch provided on the computer system accessible to a user and operable to generate a manual reset signal in response to the user's manipulation of said external reset switch. A signal stability circuit is connected to the external reset switch, for stabilizing the manual reset signal and preventing occurrence of a sudden surge of voltage when the external reset switch is turned on and turned off. A signal combination circuit includes a first input terminal coupled to receive occurrence of the manual reset signal and a second input terminal coupled to receive occurrence of a computer reset signal generated from the computer system, for logically combining occurrence of the manual reset signal and the computer reset signal to generate a modem reset signal. And a modem control circuit including a modem having a reset terminal connected to the signal combination circuit, for resetting operation of the modem in response to reception of the modem reset signal.

Alternatively, the present invention contemplates another external reset circuit for a modem including a reset generating circuit for generating a first reset signal when a modem power is supplied. A reset switch is provided on the computer system accessible to a user and is operable to generate a second reset signal in response to the user's manipulation of said reset switch. A signal stability circuit is connected to the reset switch, for stabilizing the second reset signal and preventing occurrence of a sudden surge of voltage when the reset switch is turned on and turned off. A signal combination circuit includes a first input terminal coupled to receive occurrence of the first reset signal and a second input terminal coupled to receive occurrence of the second reset signal via the signal stability circuit, for logically combining occurrence of the first and said second reset signal to generate a modem reset signal. And a modem control circuit includes a modem having a reset terminal connected to the signal combination circuit, for resetting operation of the modem in response to reception of the modem reset signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 1 illustrates a typical modem resetting configuration provided in a computer slot;

FIG. 2 illustrates another modem resetting configuration using power from the modem;

FIG. 3 is a circuit diagram of a specially designed external reset circuit for a modem configuration constructed according to a preferred embodiment of the present invention;

DETAILED DESCRIPTION OF THE PREFERRED EMBODIMENT

Figure 4:
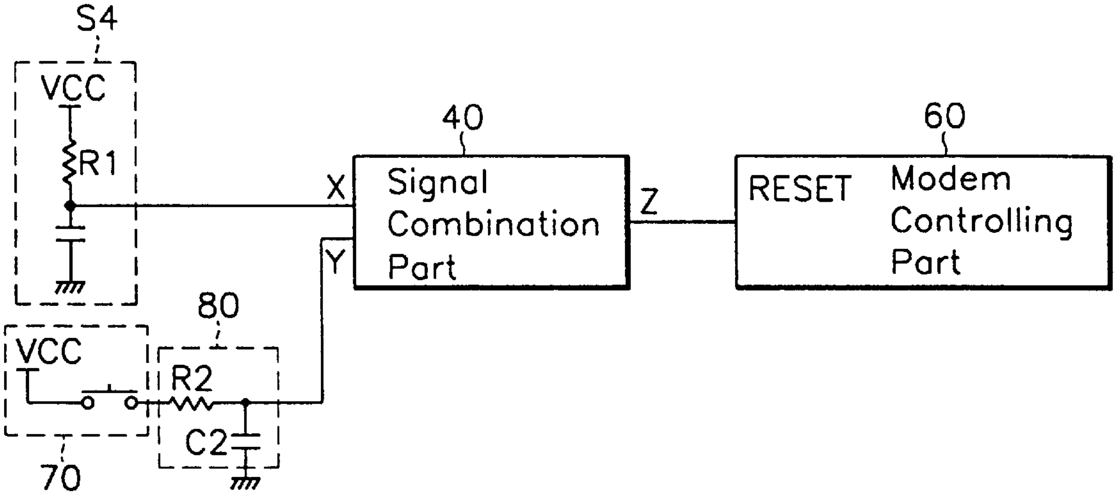
FIG. 4 is a circuit diagram of a specially designed external reset circuit for a modem configuration constructed according to another preferred embodiment of the present invention.

Referring now to the drawings and particularly to FIG. 1, which illustrates a modem configuration as is typically provided in a computer slot. A reset part of the modem provided in the computer slot includes an inverter 10 which receives a reset signal S1 generated from a central processing unit (CPU) of the computer as an input and a modem controlling part 20 having a reset terminal connected to the inverter 10. The CPU of the computer generates a reset signal for initializing the modem (not shown) as an output in order to perform the facsimile function or the voice function. The reset signal as generated from the CPU is inverted through the inverter 10, and then is input into a reverse reset terminal of the modem controlling part 20 and the modem controlling part 20 initializes the modem according to the input reset signal.

FIG. 2 illustrates another modem configuration using power from a modem. In this configuration, the modem is initialized by a reset signal generated from a separate reset generating part S2 having a resister R and a capacitor C. As shown in FIG. 2, the reset signal which is applied to the reset terminal of the modem controlling part 20, is generated by the resister R and the capacitor C using a power source Vcc. The generated reset signal is inverted by the inverter 10 and is modified to an usable condition, and then is applied to the reset terminal of the modem controlling part 20 to reset the modem. In such modem configurations as shown in FIGS. 1 and 2, when the modem having multiple functions operates in a voice function, however, an internal reset command is not generated, and the power must be applied to the modem again or the computer must be rebooted in order to reset the modem for different data transfer rates. Accordingly, it is my observation that longer time is necessary to reset a modem having multiple functions.

Turning now to FIG. 3 which is a circuit diagram of a specially designed external reset circuit for a modem in a computer housing constructed according to a preferred embodiment of the present invention. The external reset circuit for a modem includes an external reset switch 70, a signal stability 80, a reset signal terminal S3 for optionally receiving a reset signal from the computer's CPU, a signal combination part 40 for responding to an output of the reset signal terminal S3 and an output of the external reset switch 70 via the signal stability 80.

As shown in FIG. 3, the external reset switch 70 may be installed on the exterior surface of the computer housing and is readily accessible to the user for resetting operation of the internal modem. The signal stability part 80 comprises a R-C circuit for generating a stabilized signal that varies according to operation condition of the reset switch 70. The R-C circuit serves to prevent a sudden surge or spike of voltage generated when the external reset switch is turned on or turned off. The signal combination part 40 has a first input terminal X coupled to receive a reset signal S3 output from the computer slot and a second input terminal Y coupled to receive the stabilized signal output from the signal stability part 80 in order to generate a modem reset signal. The modem controlling part 60 has a reset terminal RESET connected to an output terminal Z of the signal combination part 40 for resetting operation of the modem.

FIG. 4 is a circuit diagram of another external reset circuit for a modem constructed according to another preferred embodiment of the present invention. In this configuration, the reset input terminal S4 is constructed of a resistor R1 and a capacitor C2 serially connected to a power source Vcc. The external reset switch 70 is also installed to allow the user to reset operation of the internal modem. The signal stability part 80 is a R-C circuit for generating a stabilized signal that varies according to operation condition of the reset switch 70. The signal combination part 40 has a first input terminal X connected to the reset input terminal S4 and a second input terminal Y coupled to receive the stabilized signal output from the signal stability part 80. The modem controlling part 60 has a reset terminal RESET connected to an output terminal Z of the signal combination part 40 for resetting operation of the internal modem.

Figure 5:
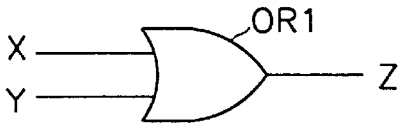
FIG. 5 to FIG. 8 are detailed circuit diagrams of a signal combination part according to the preferred embodiment of the present invention.
Figure 6:
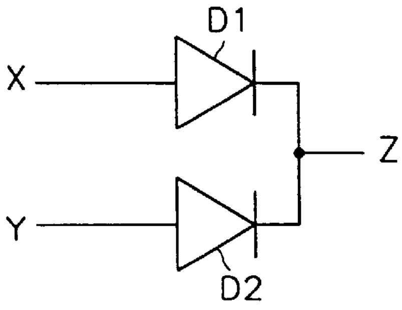
Figure 7:
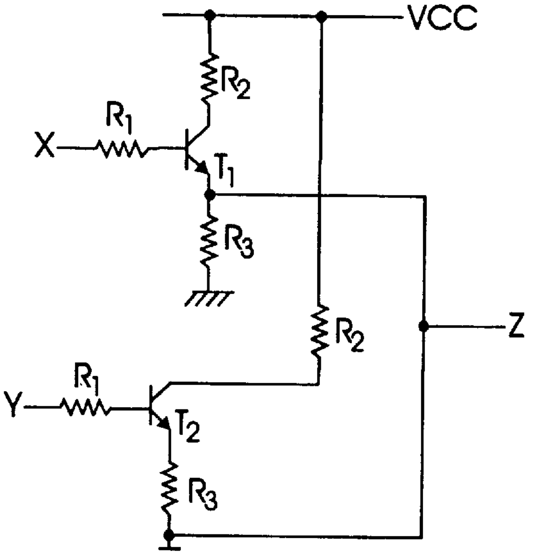
Figure 8:
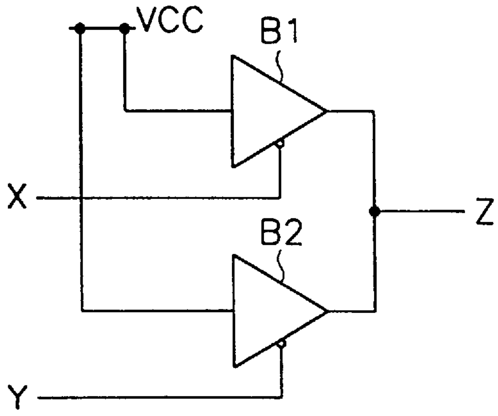

According to the principles of the present invention, the signal combination part 40 as shown in FIG. 3 and FIG. 4 may be constructed in four different configurations as shown in FIG. 5 to FIG. 8. As shown in FIG. 5, the signal combination part 40 is a two-input OR gate OR1 for logically combining an output of the reset signal terminal S3 or S4 and an output of the external reset switch 70 via the signal stability part 80 in order to generate a modem reset signal. In a second configuration as shown in FIG. 6, the signal combination part 40 includes a parallelly connected diodes D1 and D2 for regulating and combining the output of the reset signal terminal S3 or S4 and the output of the external reset switch 70 via the signal stability part 80. In a third configuration as shown in FIG. 7, the signal combination part 40 includes a parallelly connected transistors T1 and T2 each having an input terminal connected to a power source Vcc for regulating and combining the output of the reset signal terminal S3 or S4 and the output of the external reset switch 70 via the signal stability part 80. Each transistors T1 and T2 has a base coupled to receive a respective output of the reset signal terminal S3 or S4 and the external reset switch 70 via a first resistor R1, a collector connected to a power source Vcc via a second resistor R2, and an emitter connected to a ground terminal via a third resistor R3. An output terminal is then connected to the emitter of each transistors T1 and T2 to generate a modem reset signal. In a fourth configuration as shown in FIG. 8, the signal combination part 40 includes a parallelly connected three state buffers B1 and B2 each having an input terminal connected to a power source Vcc and an inverted terminal coupled to receive a respective output of the reset signal terminal S3 or S4 and the external reset switch 70 via the signal stability part 80.

To improve the function of the modem as shown in FIG. 3, AT command which is designed to use various internal commands is used, the computer's CPU (not shown) produces a reset signal S3 to the modem reset terminal or, as shown in FIG. 4, the reset generating part S4 generates reset signal S4 using power in the modem. The generated reset signal S4 or the signal generated from the external reset switch 70 through the signal stability part 80 is output into the signal combination part 40, and the signal combination part 40 preforms a logical sum operation of the above signals so as to produce a modem reset signal Z which resets the modem controlling part 60. That is, the signal combination part 40 generates a modem reset signal in response to reception of one of a reset signal input by the user via the external reset switch 70 or a reset signal generated from the computer's CPU. The modem reset signal Z then initializes the modem when there is a modem jam.

As described above, the present invention contemplates a specially designed modem configuration having an external reset circuit for allowing the user to reset operation of an internal modem. The modem configuration advantageously includes a signal combination part which logically combines an output of the external reset circuit as well as an output of the internal reset terminal responding to the computer's CPU for producing a modem reset signal to a reset terminal of the modem controlling part 60. Accordingly, when a modem having multiple functions such as facsimile, voice and modem function, experiences a jam or other problems which may occur in the respective modem function or too much time is required to return to a modem command mode, the present invention has the advantages in that the modem is reset in a shorter time without rebooting of computer and the fast return to the modem command is obtained.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An external reset circuit for a modem in a computer system, comprising:

an external reset switch provided on the computer system accessible to a user and operable to generate a manual reset signal in response to the user's manipulation of said external reset switch;

a signal stability circuit connected to said external reset switch, for stabilizing said manual reset signal and preventing occurrence of a sudden surge of voltage when said external reset switch is turned on and turned off;

a signal combination circuit having a first input terminal coupled to receive occurrence of said manual reset signal via said signal stability circuit and a second input terminal coupled to receive occurrence of a computer reset signal generated from the computer system, for logically combining occurrence of said manual reset signal and said computer reset signal to generate a modem reset signal; and a modem control circuit including a modem having a reset terminal connected to said signal combination circuit, for resetting operation of said modem in response to reception of said modem reset signal.

2. The external reset circuit of claim 1, further comprised of said signal stability circuit comprising a R-C circuit with a resistor connected to said external reset switch and a capacitor connected to a ground terminal.

3. The external reset circuit of claim 1, further comprised of said signal combination circuit comprising a OR gate having said first input terminal coupled to receive occurrence of said computer reset signal and said second input terminal coupled to receive occurrence of said manual reset for generating said modem reset signal.

4. The external reset circuit of claim 1, further comprised of said signal combination circuit comprising a first diode having said first input terminal coupled to receive occurrence of said computer reset signal, a second and parallelly connected diode having said second input terminal coupled to receive occurrence of said manual reset signal, and an output terminal connected to said first and said second diode for generating said modem reset signal.

5. The external reset circuit of claim 1, further comprised of said signal combination circuit comprising:

a first transistor having a base serving as said first input terminal coupled to receive occurrence of said computer reset signal via a first resistor, a collector connected to a first power terminal via a second resistor, and an emitter connected to a second power terminal via a third resistor;

a second transistor having a base serving as said second input terminal coupled to receive occurrence of said manual reset signal via a fourth resistor, a collector connected to said first power terminal via a fifth resistor, and an emitter connected to said second power terminal via a sixth resistor; and an output terminal connected to the emitter of said first and said second transistor for generating said modem reset signal.

6. The external reset circuit of claim 1, further comprised of said signal combination circuit comprising:

a first buffer having said first input terminal connected to a power terminal and an inverted terminal coupled to receive occurrence of said computer reset signal;

a second buffer having said second input terminal connected to said power terminal and an inverted terminal coupled to receive occurrence of said manual reset signal; and an output terminal connected to said first buffer and said second buffer for generating said modem reset signal.

7. The external reset circuit of claim 1, further comprised of said signal combination circuit corresponding an OR gate.

8. The external reset circuit of claim 1, further comprised of said signal combination circuit corresponding to a parallelly connected pair of diodes.

9. The external reset circuit of claim 1, further comprised of said signal combination circuit corresponding to a parallelly connected pair of transistors.

10. The external reset circuit of claim 1, further comprised of said signal combination circuit corresponding to a parallelly connected pair of tri-state buffers.

11. An external reset circuit for a modem, comprising:

a reset generating circuit for generating a first reset signal when a modem power is supplied;

a reset switch provided on the computer system accessible to a user and operable to generate a second reset signal in response to the user's manipulation of said reset switch;

a signal stability circuit connected to said reset switch, for stabilizing said second reset signal and preventing occurrence of a sudden surge of voltage when said external reset switch is turned on and turned off;

a signal combination circuit having a first input terminal coupled to receive occurrence of said first reset signal and a second input terminal coupled to receive occurrence of said second reset signal via said signal stability circuit, for logically combining occurrence of said first and said second reset signal to generate a modem reset signal; and a modem control circuit including a modem having a reset terminal connected to said signal combination circuit, for resetting operation of said modem in response to reception of said modem reset signal.

12. The external reset circuit of claim 11, further comprised of said signal stability circuit comprising a R-C circuit with a resistor connected to said external reset switch and a capacitor connected to a ground terminal.

13. The external reset circuit of claim 11, further comprised of said signal combination circuit comprising a OR gate having said first input terminal coupled to receive occurrence of said first reset signal and said second input terminal coupled to receive occurrence of said second reset for generating said modem reset signal.

14. The external reset circuit of claim 11, further comprised of said signal combination circuit comprising a first diode having said first input terminal coupled to receive occurrence of said first reset signal, a second and parallelly connected diode having said second input terminal coupled to receive occurrence of said second reset signal, and an output terminal connected to said first and said second diode for generating said modem reset signal.

15. The external reset circuit of claim 11, further comprised of said signal combination circuit comprising:

a first transistor having a base serving as said first input terminal coupled to receive occurrence of said first reset signal via a first resistor, a collector connected to a first power terminal via a second resistor, and an emitter connected to a second power terminal via a third resistor;

a second transistor having a base serving as said second input terminal coupled to receive occurrence of said second reset signal via a fourth resistor, a collector connected to said first power terminal via a fifth resistor, and an emitter connected to said second power terminal via a sixth resistor; and an output terminal connected to the emitter of said first and said second transistor for generating said modem reset signal.

16. The external reset circuit of claim 11, further comprised of said signal combination circuit comprising:

a first buffer having said first input terminal connected to a power terminal and an inverted terminal coupled to receive occurrence of said first reset signal;

a second buffer having said second input terminal connected to said power terminal and an inverted terminal coupled to receive occurrence of said second reset signal; and an output terminal connected to said first buffer and said second buffer for generating said modem reset signal.

17. The external reset circuit of claim 11, further comprised of said signal combination circuit corresponding an OR gate.

18. The external reset circuit of claim 11, further comprised of said signal combination circuit corresponding to a parallely connected pair of diodes.

19. The external reset circuit of claim 11, further comprised of said signal combination circuit corresponding to a parallelly connected pair of transistors.

20. The external reset circuit of claim 11, further comprised of said signal combination circuit corresponding to a parallelly connected pair of tri-state buffers.

* * * * *